United States Patent Office 3,470,847
Patented Oct. 7, 1969

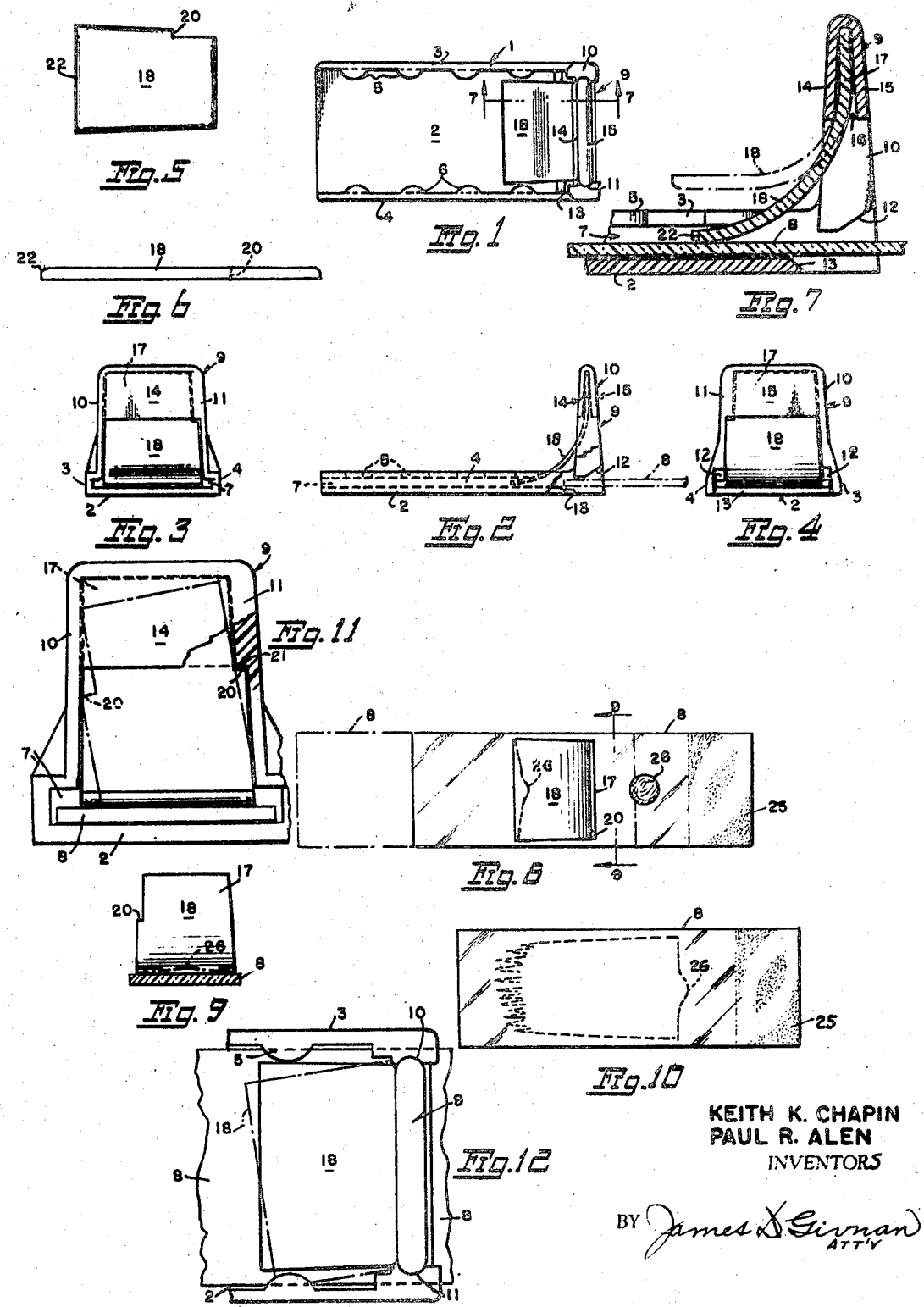

3,470,847
DIFFERENTIAL SLIDE MAKER
Keith K. Chapin and Paul R. Alen, Portland, Oreg., assignors to United Medical Laboratories, Inc., Portland, Oreg.
Filed Dec. 19, 1966, Ser. No. 602,686
Int. Cl. B05c 11/04
U.S. Cl. 118—100      3 Claims This invention relates to means for making Differential Slides for differentiating the white cell count of human blood as to percentages and the degree of maturity or abnormality of each of its various types of white cells, namely, segmented neutrophil, lymphocyte, monocyte, basophil, eosinophil and any other normal or abnormal white or red cells as viewed under a microscope in doing a "Differential Count" as commonly performed in a clincal laboratory.

One of the principal objects of the invention is to provide a new and novel slide holder including a guideway and a resiliently flexible wiper plate for smoothly, evenly and uniformly spreading a blood sample transversely and lengthwise on a glass slide for proper cellular morphology.

Another object of the invention is the provision of a device of the character described wherein test results are readily readable, easily interpreted and wherein the device can be readily and thoroughly cleaned after making each slide, and wherein the tested blood sample may be preserved after drying on the slide for repeated use by technologists or filed for future reference.

The foregoing and other objects and advantages which will become subsequently apparent reside in the details of construction and operation as more fully hereinafter described and claimed, reference being had to the accompanying drawing forming a part hereof and in which:

FIGURE 1 is a top plan view of a slide holder and slide-wiper plate made in accordance with my invention.

FIGURE 2 is a side elevational view of FIGURE 1 with a fragment of the slide holder broken away for clearness of illustration.

FIGURES 3 and 4 are left and right hand end elevational views respectively of FIGURE 2.

FIGURE 5 is a detail plan view of the wiper plate removed from the holder.

FIGURE 6 is a side elevational view of the wiper plate on an enlarged scale.

FIGURE 7 is a sectional elevational view on an enlarged scale taken approximately along the line 7—7 of FIGURE 1 and of a glass slide operationally positioned within the holder.

FIGURE 8 is a view illustrating the manner of inserting a slide and blood sample into the device.

FIGURE 9 is a sectional elevational view taken along the line 9—9 of FIGURE 8.

FIGURE 10 is a plan view of the slide with the desired blood smear automatically produced thereon by withdrawal of the slide from the holder.

FIGURE 11 is a view similar to FIGURE 3 on an enlarged scale and with a fragment broken away showing means automatically positioning the wiper plate in the holder in proper relation to the slide being dealt with, and FIGURE 12 is a top plan view of FIGURE 11.

With continuing reference to the drawing wherein like reference characters designate like parts, reference numeral 1 indicates generally the main body of the device which is preferably, though not restrictively, made of molded transparent plastic or the like and comprises an elongated flat base 2, side walls 3–4 and opposing inwardly extending projections 5 and 6 along each wall and spaced upwardly from the base to provide a guideway 7 (FIGS. 2 and 7) for properly positioning a slide 8 on and in alignment with the base 2.

Molded as an integral part of the forward or slide-entering end of the base 2 is a vertical frame-like structure indicated generally at 9 and comprising side members 10 and 11 whose bottom ends (FIGS. 2 and 7) are tapered inwardly and downwardly as at 12 for cooperating with a forwardly and downwardly tapering end 13 of the base 2 in guiding a slide 7 into the guideway 7.

The top portion of the frame members 10–11 are bridged by upwardly diverging spaced apart walls 14–15 to provide a downwardly opening socket 16 for wedged securement therewithin of the top portion 17 of a flexible slide wiper-plate indicated generally at 18.

As best illustrated in FIGURE 11, one side of the wiper-plate is shouldered as at 20 for engagement with a matching abutment 21 undercut in the frame member 11 which is of greater thickness than that of the member 10. This arrangement provides guidance of the wiper-plate upwardly into the socket 16 to a fixed position for holding the side-contacting bottom edge 22 of the wiper plate at right angles to the longitudinal axis of the slide (FIGS. 1, 5 and 12) for a purpose to be more fully hereinafter described.

An attempt to insert the wiper plate into the socket in a reverse position, as shown in broken lines in FIGURE 11 with the shoulder 20 against the opposite frame member 10, would cause a misfit and resultant misalignment of the wiper plate relative to the slide 8, as shown in broken lines in FIGURE 12. Such misalignment and warped condition of the wiper would cause uneven downward pressure across the slide and uneven thickness of a blood smear lengthwise of the slide.

The wiper plate 18 is produced in the position shown in FIGURES 5 and 6 by a stamping operation. The downward action of the cutting edges of a stamping die (not shown) will automatically round off the edges of the plate as shown so that when the finished plate is inverted and inserted into the holder, as aforesaid, its rounded bottom trailing edge will be brought into smooth, sliding contact under uniform pressure with the surface of the slide 8, as best shown in FIGURE 7, to produce a blood smear as outlined in FIGURE 10.

As shown in FIGURE 8, the glass slide 8 is preferably frosted as at 25 at one of its ends for labeling and also for convenience in manipulation of the slide as will be hereinafter recognized. In producing a blood smear in accordance with the invention, a sample indicated at 26 is deposited on the slide 8 near the frosted end thereof. The slide is then advanced slowly forward to its approximate broken line position until the blood sample upon contacting the rounded bottom edge of the wiper plate 18, will spread by capillary action across that edge as indicated by dotted lines in FIGURES 8 and 9. Then, by withdrawing the slide in an opposite direction, the transversely accumulated blood will be spread smoothly and evenly toward the opposite end of the slide over an area to the approximate extent outlined in FIGURE 7 with all the blood characteristic preserved for properly studying the cellular morphology.

The flexibility of the wiper plate 18 as illustrated by broken lines in FIGURE 7, renders it easily bendable upwardly from the slide 8 after each use for cleaning purposes.

Having thus described our invention, which we claim as new and desire to protect by Letters Patent is:

1. A differential slide maker comprising in combination,
   a base, means on the top side of the base adapted to guide a slide therealong with a blood sample deposited on the slide near one end thereof, a slide wiper plate, means at one end of the base holding said wiper plate in substantially inclined relation to the base with the bottom end of said plate adapted for wiping contact with a slide moved onto the base in one direction, whereby said blood sample upon contact with said bottom end of the wiper plate in one direction will by capillary action spread across that said end, across the slide and lengthwise thereof upon withdrawal of the slide from the base in an opposite direction, said wiper plate holding means comprising a vertically disposed frame integral with one end of said base and having two side frame members bridged across by means wedgingly engaging the top end of said wiper plate and provided with an inwardly extending abutment in one of said frame members, and wherein one side of said wiper plate has a corresponding abutment adapted for engagement with said frame member abutment to insure proper engagement of the wiper plate within said frame with the bottom edge of said plate at right angles to the longitudinal axis of said base and to a slide movable therealong.

2. A differential slide maker as claimed in claim 1 wherein said wiper plate is of resiliently flexible material.

3. A differential slide maker as claimed in claim 1 wherein said base is elongated and said means on the topside comprises means along both of its sides forming a guideway for movement of a slide onto and lengthwise of the base.

References Cited
UNITED STATES PATENTS

| | | | |
|---|---|---|---|
| 1,430,888 | 10/1922 | Dittmar | 117—64 |
| 2,066,780 | 1/1937 | Holt | 117—64 |
| 2,287,350 | 6/1942 | Lodding | 15—256.51 |
| 2,315,475 | 3/1943 | Cobb et al. | 117—38 X |
| 2,851,374 | 9/1958 | Dombrowski | 117—38 X |
| 2,987,748 | 6/1961 | Scott | 15—256.51 |

FOREIGN PATENTS

| | | |
|---|---|---|
| 749,355 | 5/1956 | Great Britain. |
| 800,607 | 8/1958 | Great Britain. |
| 982,361 | 2/1965 | Great Britain. |

MORRIS KAPLAN, Primary Examiner

U.S. Cl. X.R.

118—506